United States Patent
Dong et al.

(10) Patent No.: US 12,195,662 B2
(45) Date of Patent: Jan. 14, 2025

(54) PHYTOL-BASED SURFACTANTS AND METHODS THEREFOR

(71) Applicant: Alliance for Sustainable Energy, LLC, Golden, CO (US)

(72) Inventors: Tao Dong, Lakewood, CO (US); Robert David Allen, Golden, CO (US); Lieve Laurens, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 17/970,938

(22) Filed: Oct. 21, 2022

(65) Prior Publication Data

US 2023/0128213 A1   Apr. 27, 2023

Related U.S. Application Data

(60) Provisional application No. 63/270,303, filed on Oct. 21, 2021.

(51) Int. Cl.
*C09K 23/32* (2022.01)
*C09K 23/28* (2022.01)

(52) U.S. Cl.
CPC ............ *C09K 23/32* (2022.01); *C09K 23/28* (2022.01)

(58) Field of Classification Search
CPC .............................. C09K 23/32; C09K 23/28
USPC ........................................................ 549/229
See application file for complete search history.

(56) References Cited

U.S. PATENT DOCUMENTS

2022/0041830 A1   2/2022   Dong et al.

FOREIGN PATENT DOCUMENTS

JP   2002138061   *   5/2002   ............. C07C 29/10

OTHER PUBLICATIONS

Machine Translation of JP2002138061, 4 pages, retrieved 2023 (Year: 2023).*
Akbar et al., "Phytantriol Based Smart Nano-Carriers for Drug Delivery Applications", European Journal of Pharmaceutical Sciences, Apr. 2017, vol. 101, pp. 31-42.
Barauskas et al., "Phase Behavior of the Phytantriol/Water System", Langmuir, Oct. 2003, vol. 19, No. 23, pp. 9562-9565.
Dannecker et al., "Facile and Sustainable Synthesisof Erythritol bis(carbonate), a Valuable Monomer for Non-Isocyanate Polyurethanes (NIPUs)", Scientific Reports, 2019, vol. 9 No. 9858, pp. 1-6.
Guidi et al., "Thermal (Catalyst-Free) Transesterification of Diols and Glycerol with Dimethyl Carbonate: A Flexible Reaction for Batch and Continuous-Flow Applications", ACS Sustainable Chemistry & Engineering, 2016, vol. 4, pp. 6144-6151.
McGinty et al., "Fragrance material review on phytol", Food Chemical Toxicology, Jan. 2010, vol. 48, Supplement 3, pp. S59-S63.
Prabha et al., "Phytol—A biosurfactant from the aquatic weed Hydrilla verticillata", Biocatalysis and Agricultural Biotechnology, 2019, vol. 17, pp. 736-742.

(Continued)

*Primary Examiner* — Jeffrey S Lundgren
*Assistant Examiner* — Heather Dahlin
(74) *Attorney, Agent, or Firm* — Neal S. Vickery

(57) ABSTRACT

Described herein are compositions and methods for the conversion of chlorophyll-derived phytol into useful and economically viable surfactants. The provided compositions utilize the hydrophobic phytol structure and added functional groups to increase hydrophilicity at one end of the molecule.

12 Claims, 11 Drawing Sheets

(56) References Cited

OTHER PUBLICATIONS

Rizwan et al., "Preparation of Phytantriol Cubosomes by Solvent Precursor Dilution for the Delivery of Protein Vaccines", European Journal of Pharmaceutics and Biopharmaceutics, Sep. 2011, vol. 79, No. 1, pp. 15-22.

* cited by examiner

PHYTOL-BASED SURFACTANTS AND METHODS THEREFOR

CROSS-REFERENCE TO RELATED APPLICATIONS

This application claims priority from U.S. Provisional Patent Application No. 63/270,303, filed on Oct. 21, 2021, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Biomass, including microalgae, contains significant amount of chlorophyll. Chlorophyll consists of an ester-linked phytol and porphyrin functional group. The phytol, a naturally occurring branched, mono-unsaturated, hydrocarbon, can be cleaved from the chlorophyll, and is currently used as a fragrance or is converted into a biofuel via catalytic upgrading. Microalgae can accumulate high content of chlorophyll (up to 10% by dry weight), and therefore large amount of phytol might be generated if algal biofuel is commercialized in the near future. Creating phytol-based value-added co-products at the similar scale of algal biofuel production is required to drive down the fuel cost without saturated niche chemical markets. Therefore, it is preferred to produce phytol-based co-products with large market volume.

The double bond in phytol hydrocarbon chain can be epoxidized and produce two hydroxyl groups via sequential ring opening. This triol is called phytantriol, which is a viscous liquid that is colorless to light yellow and with a sweetish odor at room temperature. Phytantriol has been used in cosmetic products and as a food additive. It improves the moisture retention properties of skin and hair and acts as a penetration enhancer to increase the effect of panthenol, vitamins, and amino acids. Recently, phytantriol has been used to prepare cubosomes for drug delivery. Cubosomes are discrete, sub-micron, nanostructured particles of the bicontinuous cubic liquid crystalline phase. The term "bicontinuous" refers to two distinct hydrophilic regions separated by the bilayer. Bicontinuous cubic crystalline materials have been an active research topic because their structure lends itself well to controlled-release applications. Lipids that are commonly used to prepare cubosomes include emulsifying agents and food additives such as unsaturated mono- and diglycerides, in particular glyceryl monooleate (GMO). Although these lipids are inexpensive and biodegradable, the ester moiety renders them susceptible to hydrolysis. Phytantriol offers several advantages such as structural stability and higher purity over GMO or GMO-based derivatives. However, the market for phytantriol can be quickly saturated due to the low volumes required by current useful applications.

It can be seen from the foregoing that there remains a need in the art for high-value conversion of phytol into large-market bioproducts to increase the economics of biorefineries from carbon-efficient feedstocks such as algal biomass.

SUMMARY

Described herein are compositions and methods for the conversion of chlorophyll-derived phytol into useful and economically viable surfactants. The provided compositions utilize the hydrophobic phytol structure and added functional groups to increase hydrophilicity at one end of the molecule.

Phytol is a promising surfactant precursor due to the terminal hydroxyl group and the unsaturated double bond, which can be modified into functional groups. The long hydrocarbon chain is hydrophobic, while the hydroxyl end can provide hydrophilicity. For example, the phytol can be rendered amphiphilic by modifying the double bond into hydrophilic groups. The unsaturated double bond on phytol can be epoxidized to form an epoxy group, which can sequentially react with $CO_2$ to produce a 5-member cyclic carbonated group. The hydrophilic carbonated group can serve as the hydrophilic portion of the phytol derivative as a surfactant. Alternatively, the carbonated group can be reacted with compounds with amine groups to form a useful surfactant molecules via aminolysis. For example, an amino acid (e.g., glycine) can be reacted with the carbonated phytol to form a novel molecule which has surface activity. Various amine compounds can be used for this purpose, including amino acids, ethylenimine, diamines, etc. Therefore, phytol serves as a versatile precursor to produce a series of novel compounds with surface activities.

In an aspect, provided is a surfactant having the formula:

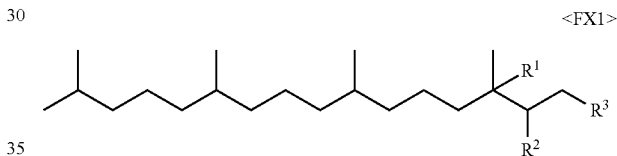

<FX1> wherein each of $R^1$, $R^2$ and $R^3$ are each independently —OH or an ester having the formula —OOCR$^4$; wherein $R^4$ is an alkylether selected from the range of $C_1$-$C_{10}$, a hydroxyamine selected from the range of $C_1$-$C_{10}$, a cyanocarboxylic acid selected from the range of $C_1$-$C_{10}$, an arylether or O bonded with $R^1$, $R^2$ or $R^3$ to form an ethylene carbonate group or a dimer; and wherein $R^1$, $R^2$ and $R^3$ are not each —OH. The surfactant may be derived from phytol, for example, phytol cleaved from chlorophyll.

As examples, each of $R^1$, $R^2$ or $R^3$ may be described by the chemical formula:

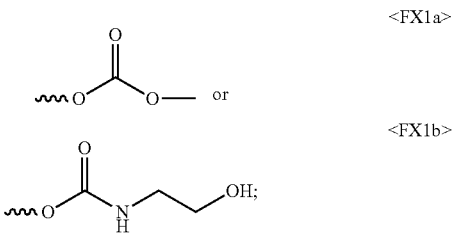

<FX1a>

<FX1b> wherein the symbol ∿∿∿ is a covalent bond connected at $R^1$, $R^2$ or $R^3$ in formula <FX1>.

As examples, the surfactant may further be described by the formulas:

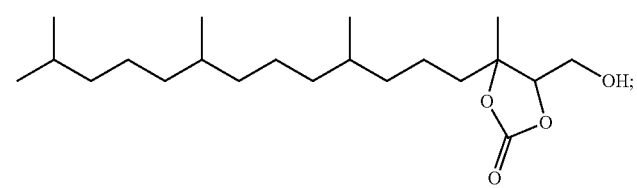
<FX2>
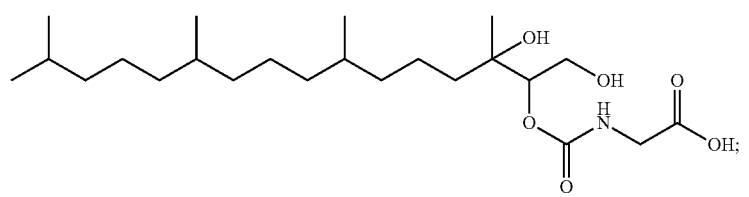
<FX3>
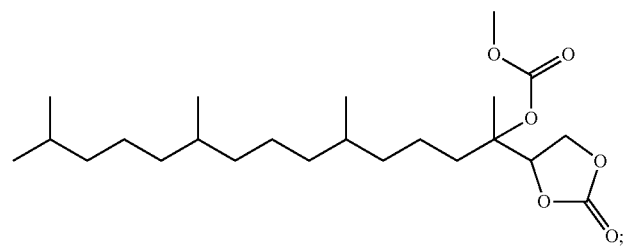
<FX4>
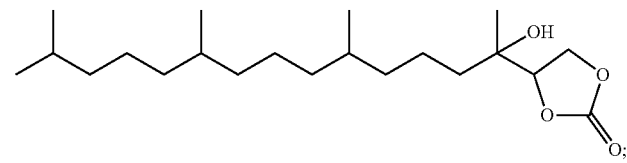
<FX4a>
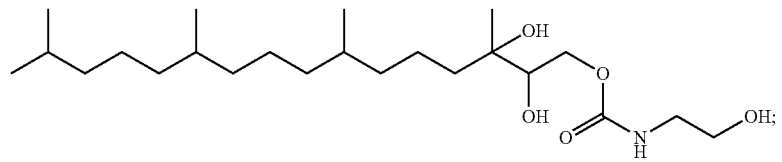
<FX6>
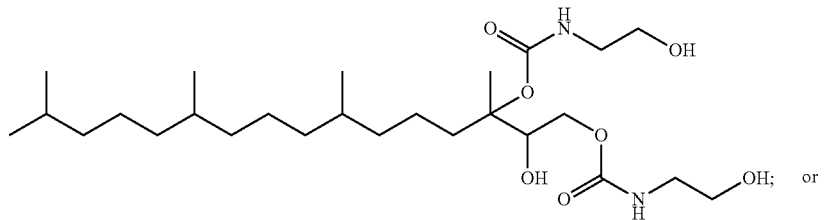
<FX7>
or
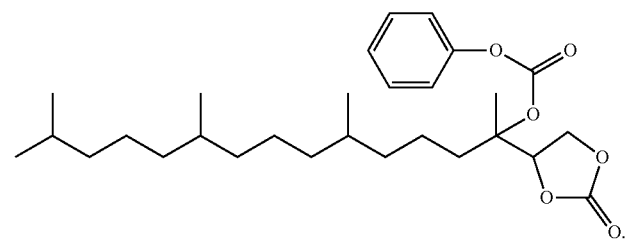
<FX8>

The molecule described in <FX4> may react with resorcinol via transesterification reactions to form <FX11>:

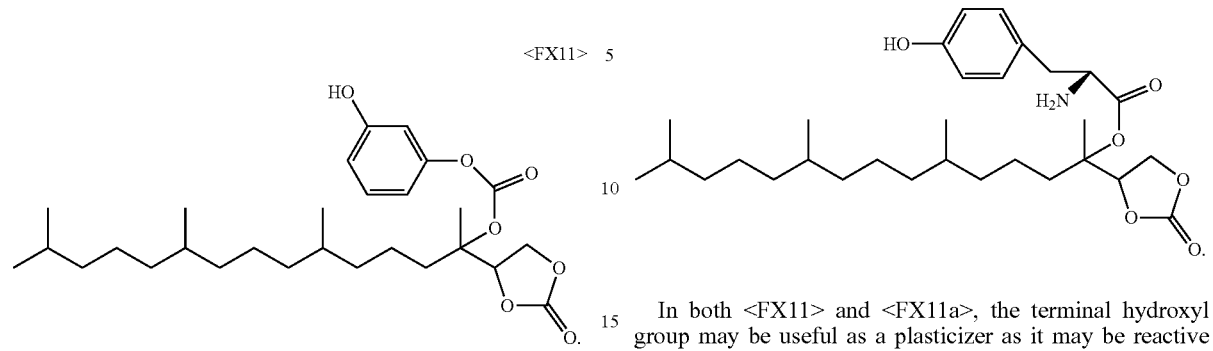

Additionally, tyrosine can be reacted, for example with <FX4>, as an amino acid donor and esterified to form <FX11a>:

In both <FX11> and <FX11a>, the terminal hydroxyl group may be useful as a plasticizer as it may be reactive including in polymerization. The Hydroxyl-functional surfactant precursors provide the opportunity for simple synthesis of a new class of non-ionic surfactants. For example, with one or more —OH groups on the end of the hydrophobic molecule, one could easily polymerize ethylene oxide to form short PEG chains. The fact that there is a plurality of —OH groups that could be used, it gives the further opportunity to create topologically-complex surfactants. For example, 'T-shaped' surfactants often have unusual phase behavior and significantly differing performance that more traditional designs. Examples of T-shaped surfactants are provided below:

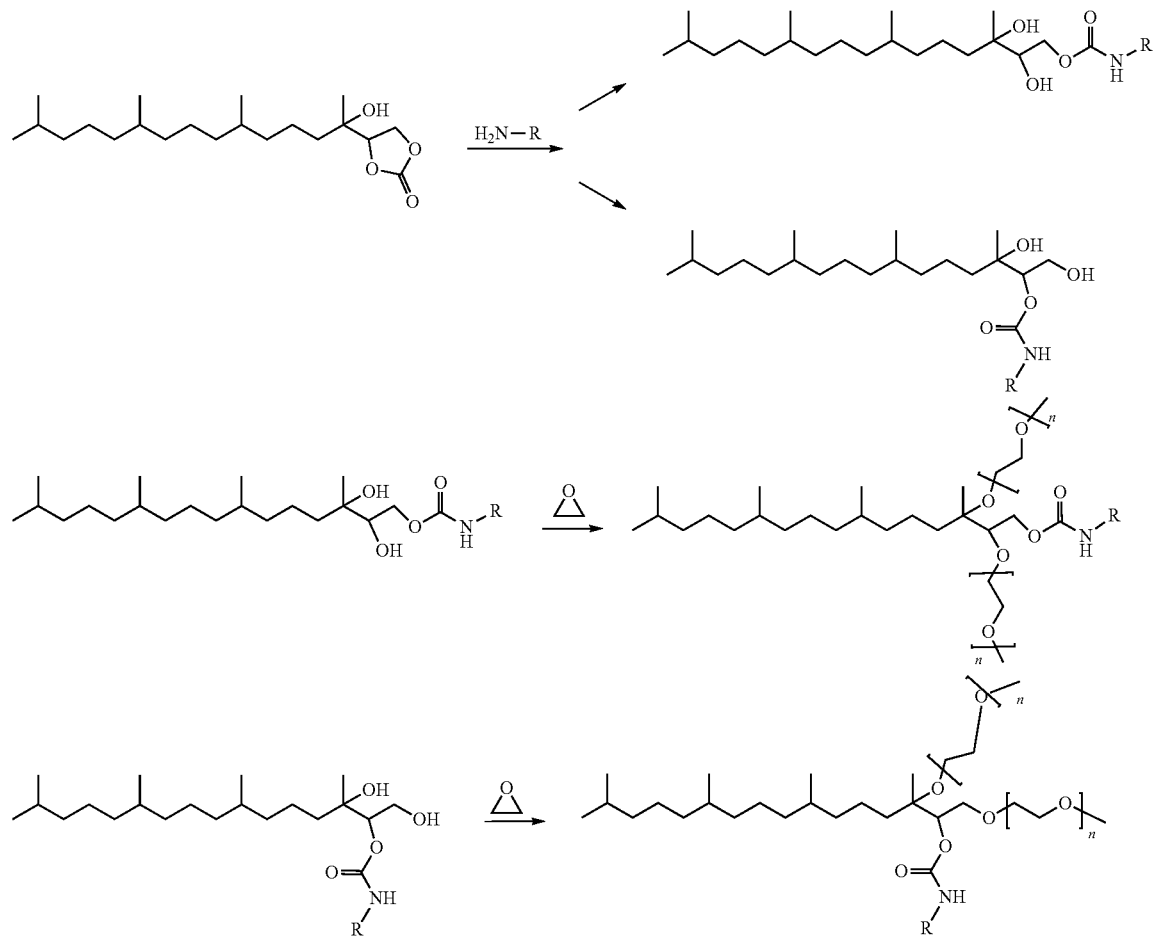

R in the above example can be any group, n can be 1-20. Phytol has only one —OH group, and can react with ethylene oxide to produce one ethylene glycol chain (hydrophilic). Phytantriol has three —OH groups and can react with ethylene oxide to produce three ethylene glycol chains. As described herein, cyclic carbonate can be reacted to produce an α or β hydroxyl group first, then use ethylene oxide to react with the two —OH groups to produce T-shaped surfactant.

The surfactant may also react further with the base molecule to form, for example, a dimer or a trimer. An example of a dimer formed by two of the molecules of <FX4> is:

<FX5>

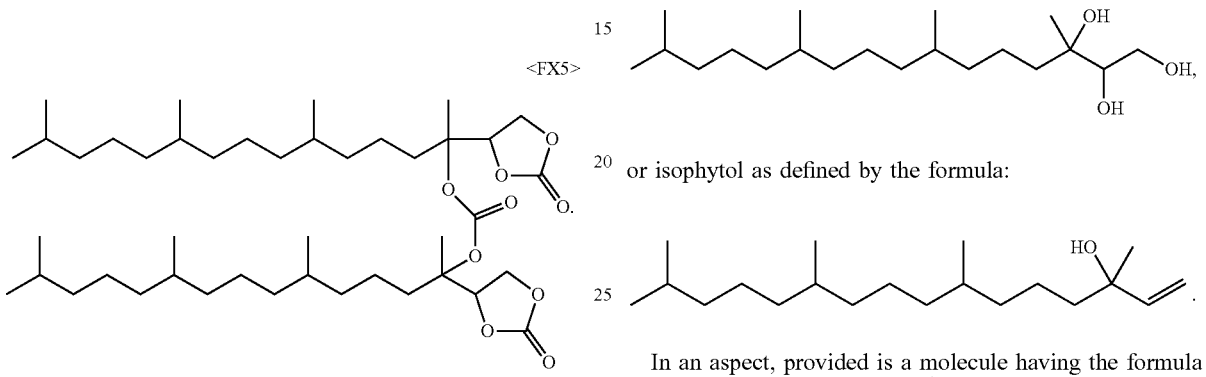

The molecules and surfactants described herein may also be useful as plasticizers, wherein the described molecules increase the flexibility (e.g., lower the glass transition temperature) of polymers/plastics, for example, poly(ethylene terephthalate) (PET) and poly(vinyl chloride) (PVC). Biodegradability of polymers may be increased by including phenol functional groups as show in formula <FX8>.

The surfactants described herein may reduce the surface tension of water at about 25° C. and about 1 atm to less than 10 mN/m, 20 mN/m, 40 mN/m, or optionally, 50 mN/m at a weight percentage less than or equal to 0.0001%, 0.00015%, 0.0002%, or optionally 0.00025%.

In an aspect, provided is a method comprising reacting phytantriol with dimethyl carbonate, thereby generating a carbonate surfactant. The step of reacting may be catalyzed by triazabicyclodecene (TBD). The step of reacting may be performed at a temperature selected from the range of 25° C. to 50° C., 50° C. to 100° C., 50° C. to 200° C., or optionally, 0° C. to 100° C. The step of reacting may be performed at a pressure selected from the range of 0.1 bar to 1 bar, 0.1 to 0.5 bar, 0.2 bar to 0.5 bar, 0.2 bar to 0.7 bar, 0.001 bar to 1.01 bar, or optionally, 0.2 bar to 1 bar. The step of reacting may be performed in the presence of a carbonate solvent, for example, said carbonate solvent can be dimethyl carbonate, diethyl carbonate, diphenyl carbonate, etc.

The described method may further comprise reacting the carbonate surfactant with an amine, thereby generating an amine surfactant. The step of reacting the carbonate surfactant with an amine may be performed at a temperature selected from the range of 25° C. to 50° C., 50° C. to 100° C., 50° C. to 200° C., or optionally, 0° C. to 100° C.

The carbonate surfactant or amine surfactant may have the formula described herein by <FX1>, including the additional examples provided by <FX1a> and <FX1b> as well as <FX2> through <FX7>.

The described method may further comprise reacting phytantriol, the carbonate surfactant or the amine surfactant with diphenyl carbonate to generate a surfactant with aromatic group, for example, to generate an aromatic surfactant as described by <FX8>.

In an aspect, provided is a method comprising reacting carbonated phytantriol with resorcinol, hydroxyl benzoic acid, or tyrosine, thereby generating a plasticizer, for example, the molecules described by <FX11> or <FX11a>. The step of reacting may be in the presence of a TBD catalyst.

The described methods may further comprise epoxidizing phytol, thereby generating phytantriol as defined by the formula:

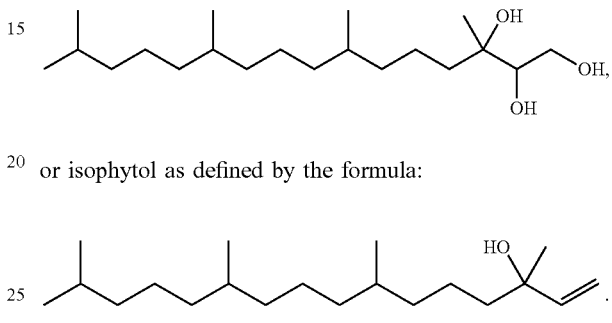

or isophytol as defined by the formula:

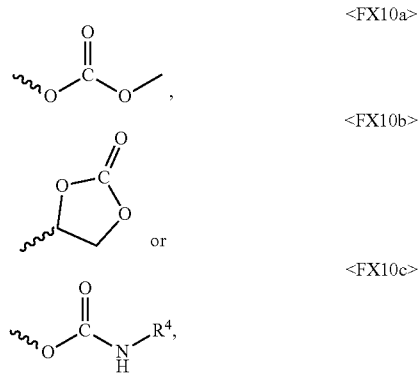

In an aspect, provided is a molecule having the formula provided in <FX1>, wherein $R^1$ comprises at least one of a hydroxyl group, a carbonate group, or a carbamate group, $R^2$ comprises at least one of a hydroxyl group, a carbonate group, or a carbamate group, $R^3$ comprises at least one of a hydroxyl group, a carbonate group, or a carbamate group, and the symbol ⌇ is a covalent bond connected to an unsaturated hydrocarbon chain.

At least one of $R^1$, $R^2$ or $R^3$ may comprise:

<FX10a>

<FX10b> or

<FX10c> wherein $R^4$ comprises a hydroxyl group.

BRIEF DESCRIPTION OF DRAWINGS

Some embodiments are illustrated in referenced figures of the drawings. It is intended that the embodiments and figures disclosed herein are to be considered illustrative rather than limiting.

DETAILED DESCRIPTION

Figure 1:
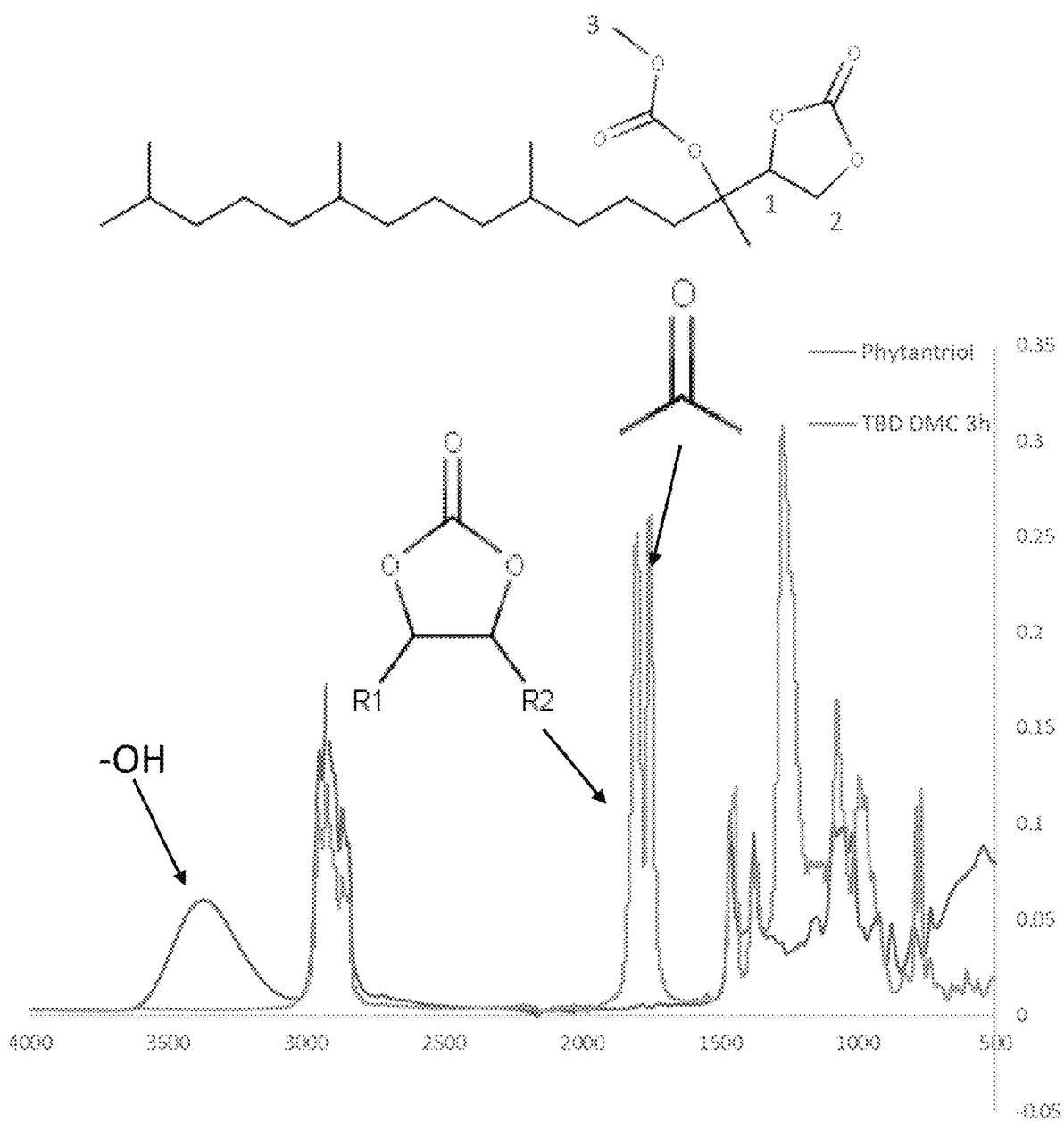
FIG. 1 provides Fourier transform infrared (FTIR) spectroscopy data for a reaction between phytol and dimethyl carbonate at 60° C. and 314 mbar for 3 hours.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

As used herein, the term "surfactant" refers to a compound or molecule that lowers the surface tension of water. Surfactant as used herein may have a branched aliphatic hydrophobic tail. The hydrophilic group may comprise one or more of a hydroxyl group, a carbonate group, a carbamate group, and/or a phenyl group. The surfactants described herein may reduce the surface tension of water to less than 10 mN/m, 20 mN/m, 40 mN/m, or optionally, 50 mN/m at standard conditions (25° C., 0.9-1.0 bar).

The present application relates to the generation of surfactants or plasticizers from phytol, which may be cleaved from chlorophyll to provide useful and valuable uses from excess biomass. Phytol may be epoxidized to add hydroxyl groups and generate phytantriol.

Phytantriol is then reacted with dimethyl carbonate (DMC, $CH_3OCOOCH_3$) using methanol as a solvent and triazabicyclodecene (TBD) at 60° C. and 314 mbar for 3 hours. Examples of resultant surfactant molecules are given by the formulas:

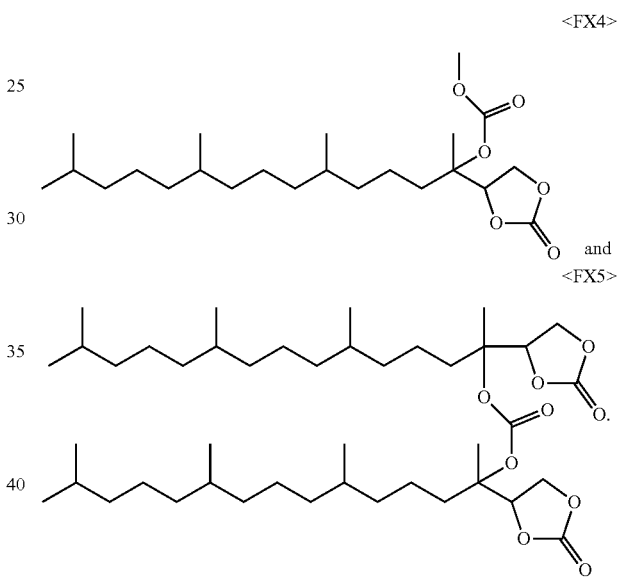

Figure 2:
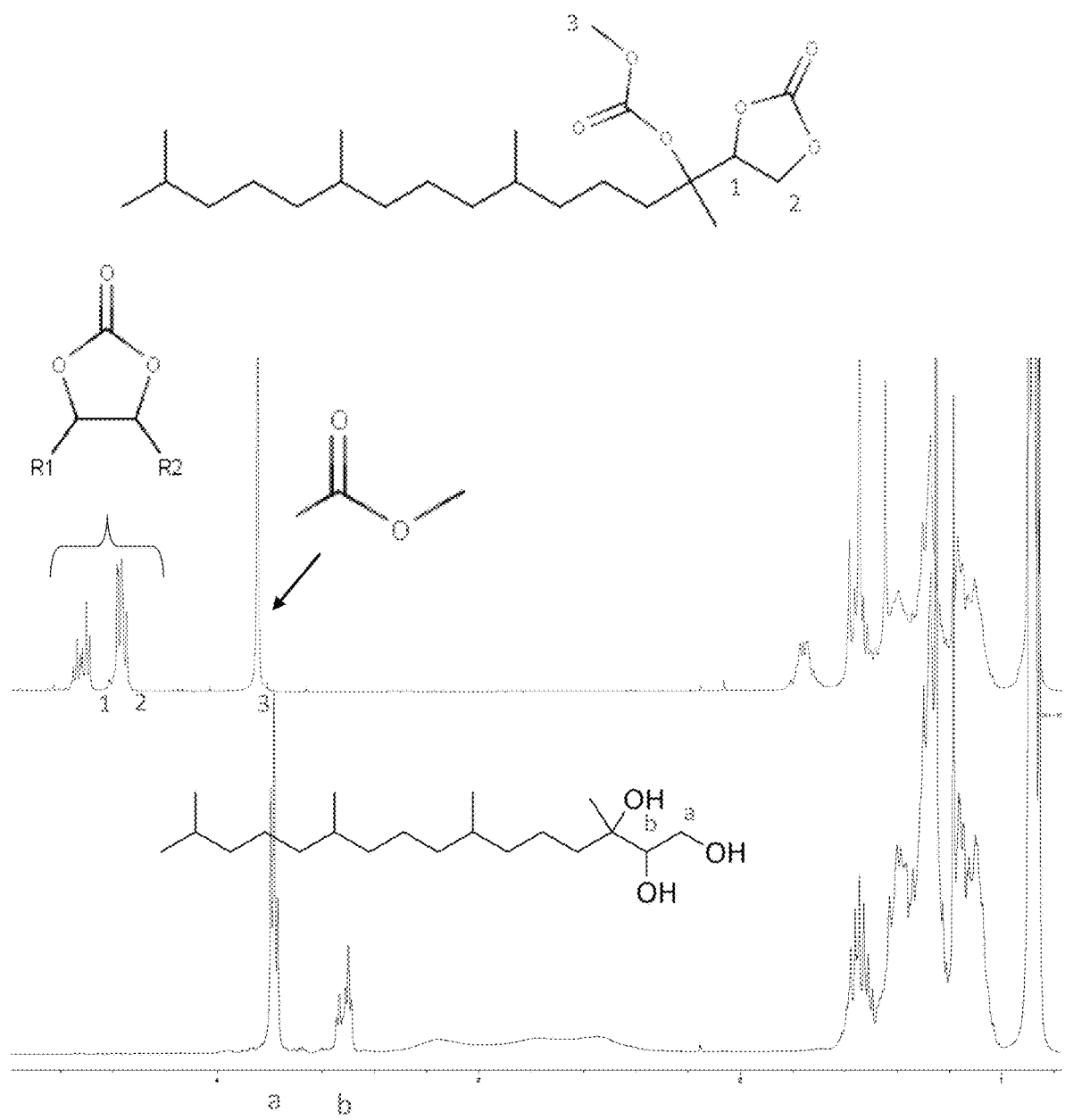
FIG. 2 provides nuclear magnetic resonance (NMR) data for a reaction between phytol and dimethyl carbonate at 60° C. and 314 mbar for 3 hours.
Figure 3:
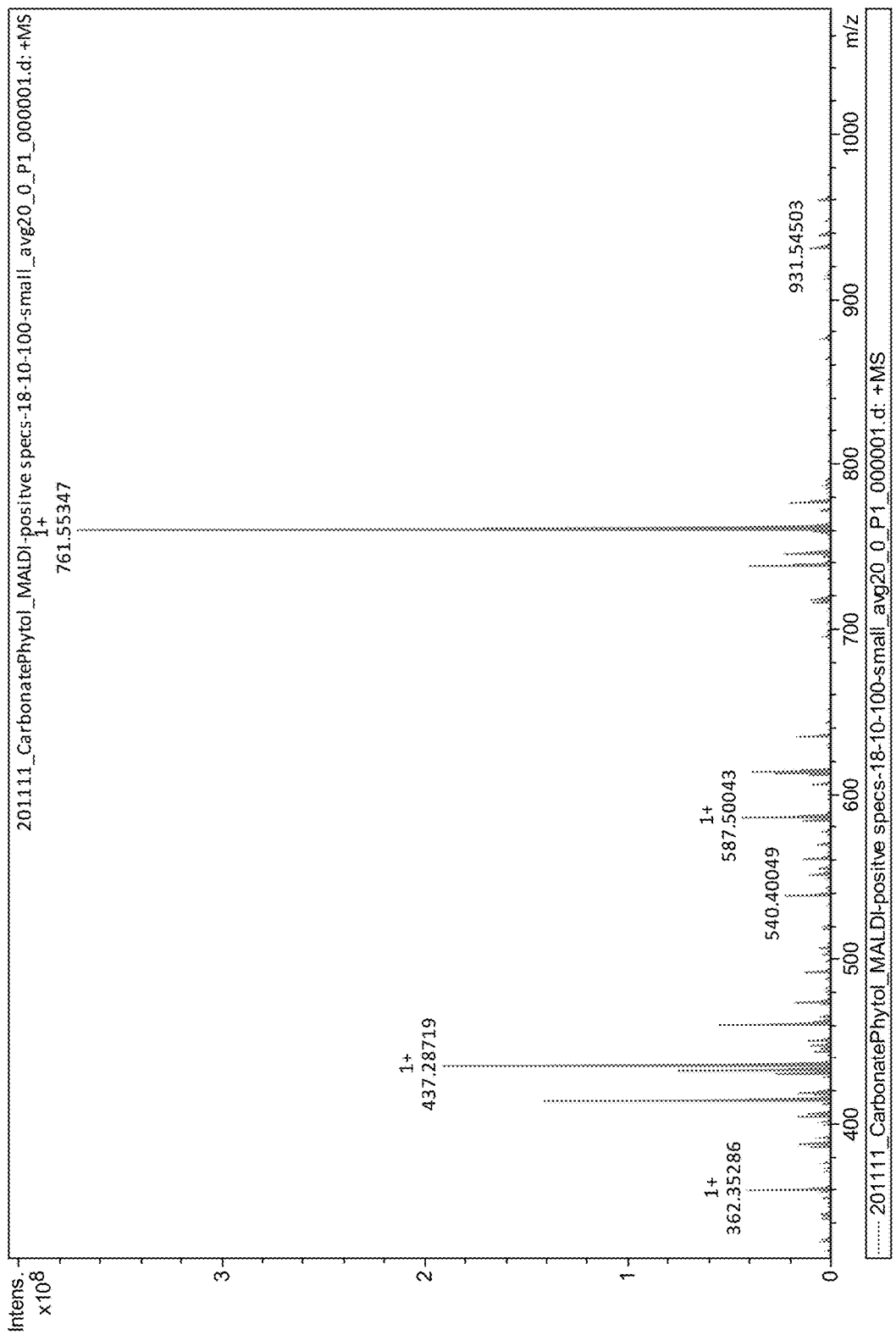
FIG. 3 provides mass spectroscopy data for a reaction between phytol and dimethyl carbonate at 60° C. and 314 mbar for 3 hours.

Characterization of the generated compounds is provided in FIGS. 1-3. FIG. 1 provides FTIR and FIG. 2 provides NMR data, both illustrating the addition of

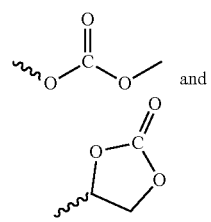

groups to the base phytantriol structure. FIG. 3 provides mass spectroscopy data to further describe and characterize the reaction products. Peaks can be seen for both the compound shown in <FX4> at a mass of 414.298 amu and <FX5> at a mass of 738.565 amu.

Figure 4:
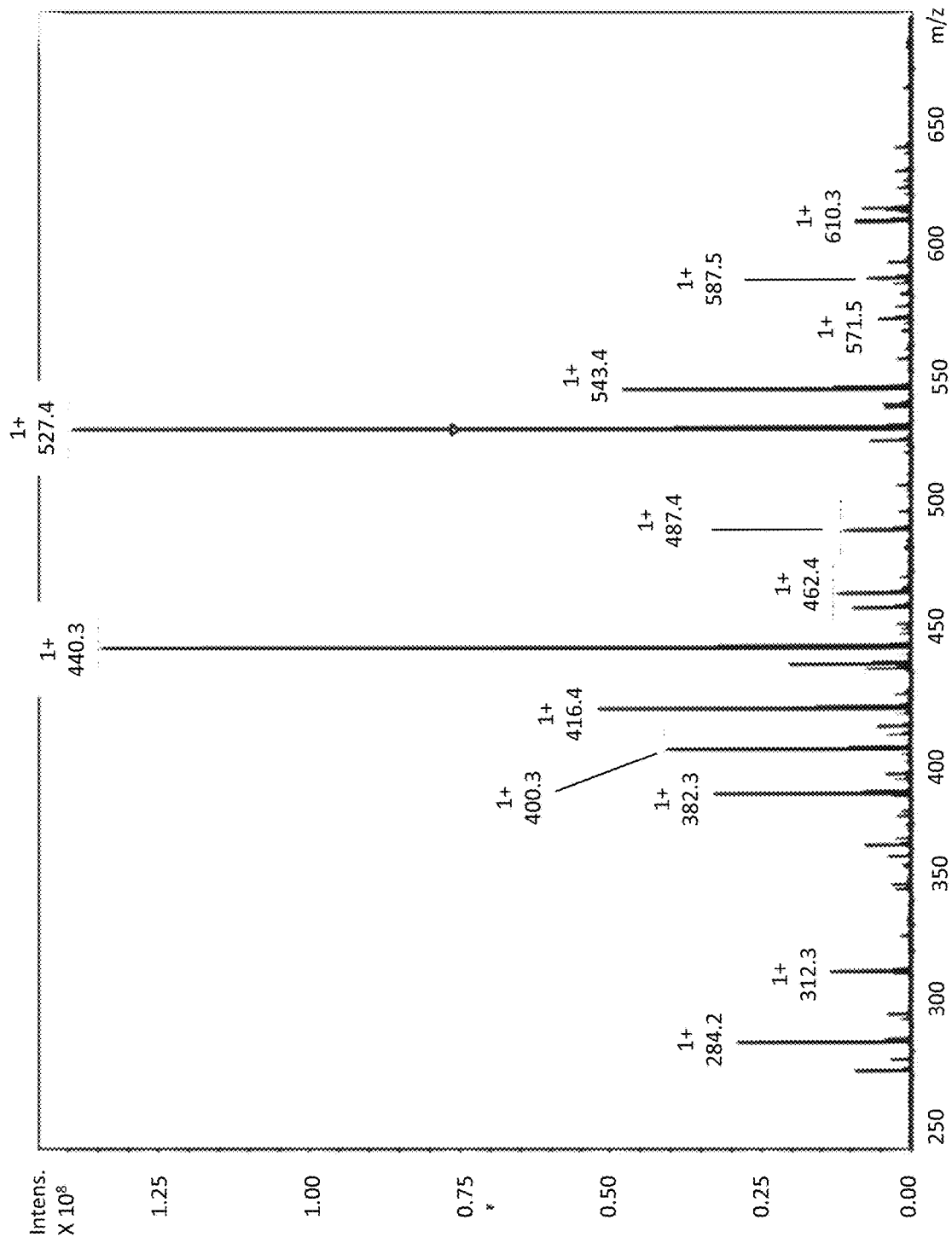
FIG. 4 provides mass spectroscopy data for a reaction between phytol and dimethyl carbonate at 60° C. and 314 mbar for 3 hours.

2-aminoethanol ($H_2NCH_2CH_2OH$) can also be reacted from compounds resulting from the DMC-phytantriol reaction (e.g., the molecule described in <FX4>) to form amine and/or carbamate groups by reacting at a temperature of 70° C. at atmospheric pressure for 4 hours, which are characterized using mass spectroscopy in FIG. 4, which shows peaks relating to the molecule described by <FX6> at 440.334 amu and <FX7> at 527.366 amu.

Figure 5:
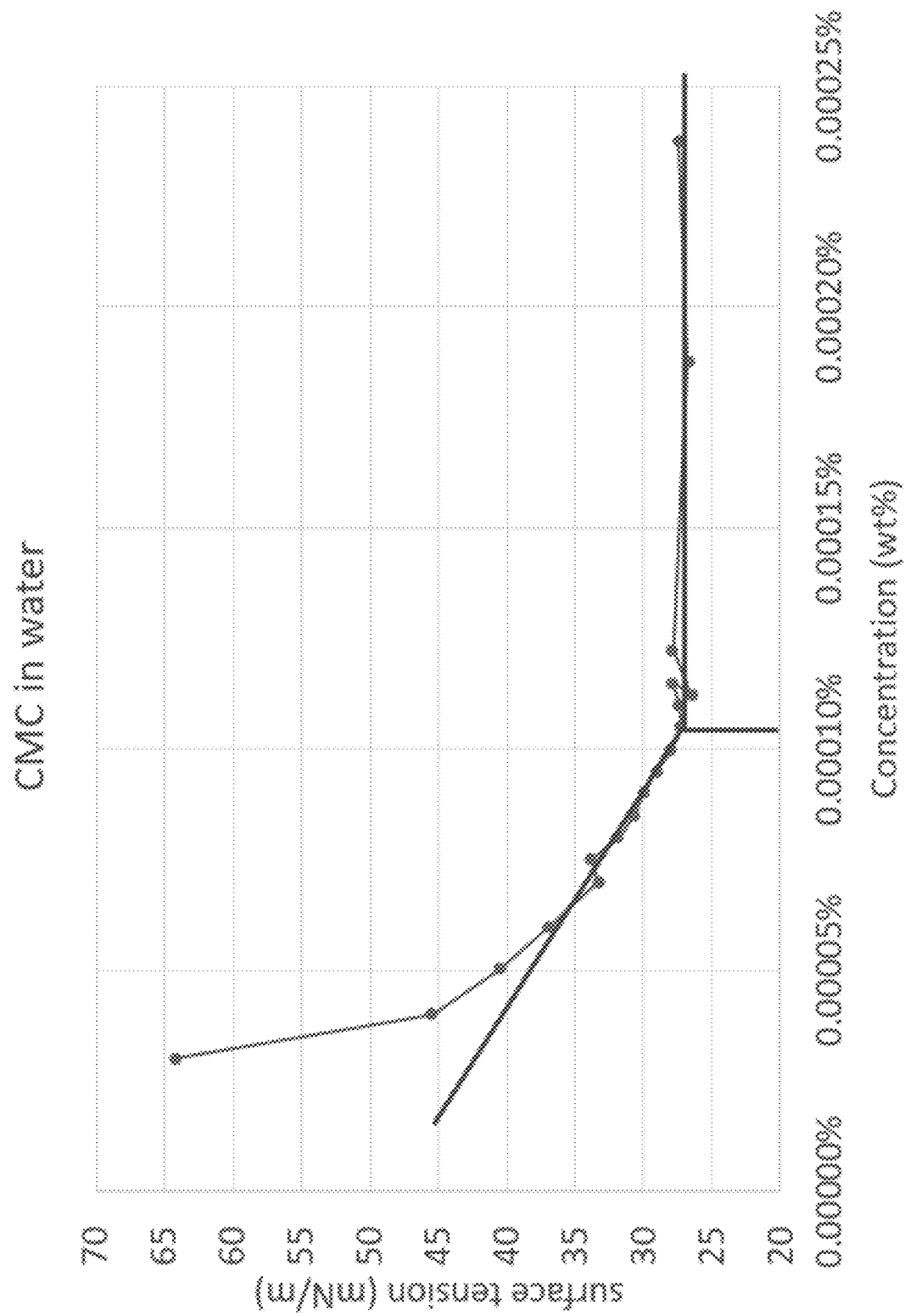
FIG. 5 shows critical micelle concertation (CMC) for an example, as described herein.

The products of the 2-aminoethanol reaction surfactant properties are characterized in FIG. 5 which measures the surface tension of water with respect to the concentration of surfactant.

Diphenyl carbonate (DPC, BeOCOOBe) can also be included as a reactant using a TBD catalyst, either with phytantriol or compounds resulting from the DMC-phytantriol reaction to add aromatic groups.

Example 1—Fractionation Analysis of Phytol-Based Surfactants

Synthesis. Phytantriol (1.5 g) was added into a round bottom flask with 20 mL of dimethyl carboante (DMC). Triazabicyclodecene (TBD) was added (1 wt %) as a catalyst for reaction at 60° C. and ambient pressure for 3 hours. Then the reactants was moved to a rotovap at 314 mbar and 60° C. to react for 1 hour, and 50 mbar at 80° C. for 1 hour. The product is fractionated by using a silica flash column.

Chromotography separation to purify surfactants. The produced mixture was loaded on a silica flash column (RediSepRf 120 gram), and fractionated on a Combi Flash Nextgen 300 system equipped with an evaporative light scattering detector (ELSD). Hexane and ethyl acetate and (85:15, v/v) was used as solvent to elute the compounds for fractionation. Three major fractions (F1, F2 and F3) were collected for TLC and FTICR analysis.

Figure 6:
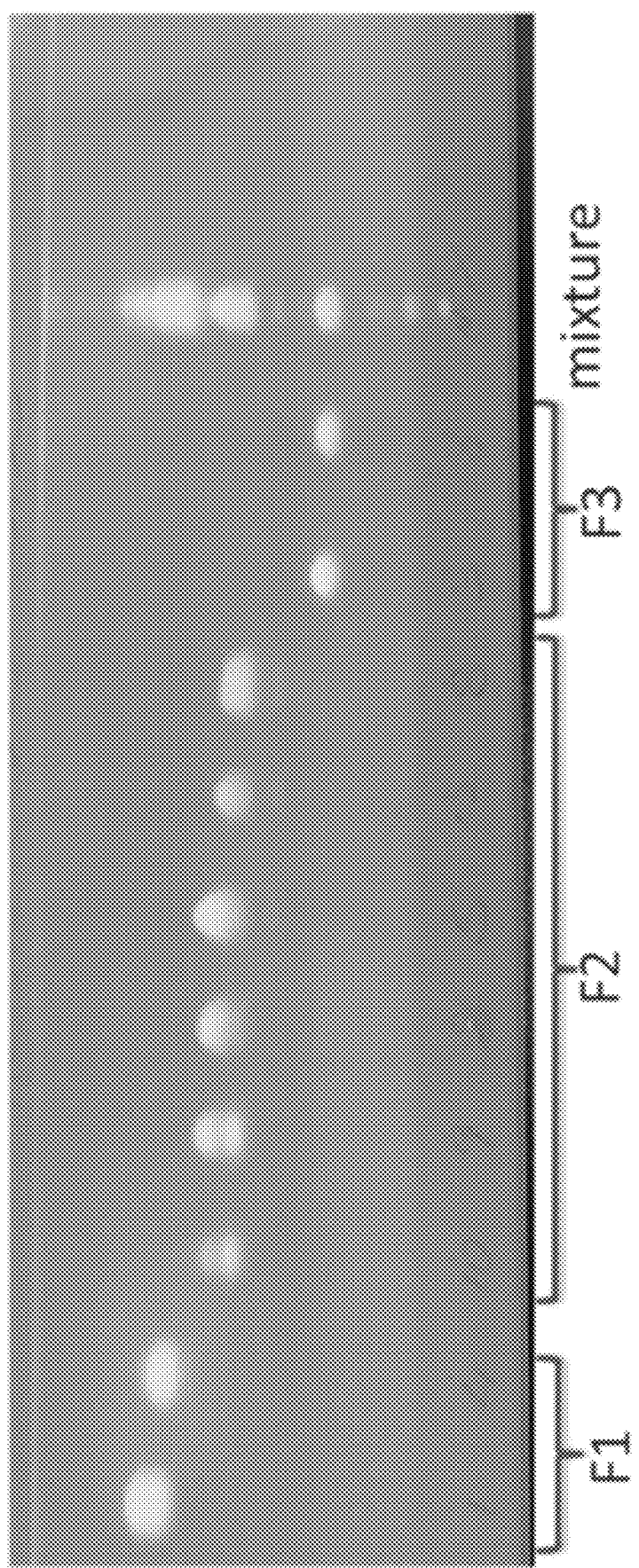
FIG. 6 provides chromatography separation of phytol-based surfactants (fractions eluted over time; TLC analysis of collected fractions.

The reacted mixture is shown on the right end of the TLC plate, confirming multiple compounds in it. After the flash chromatography separation, there were three major peaks. The three fractions were analyzed multiple times on a TLC plate. The different retention time on TLC shows that the mixture was successfully separated into three fractions (FIG. 6).

Figure 7A:
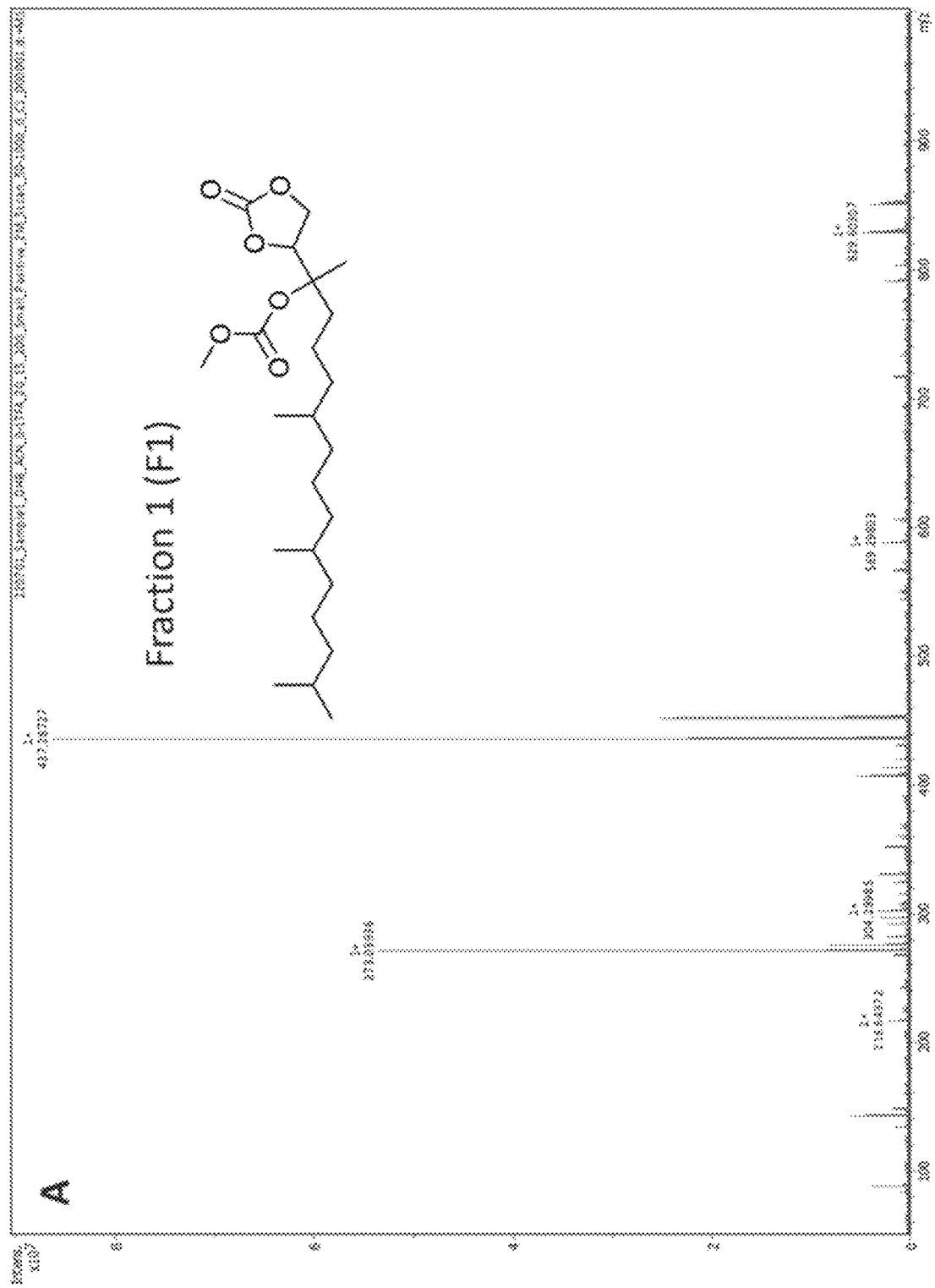
FIGS. 7A-7C provide mass spectra data via FTICR of fraction F1, fraction F2 and fraction F3.
Figure 7B:
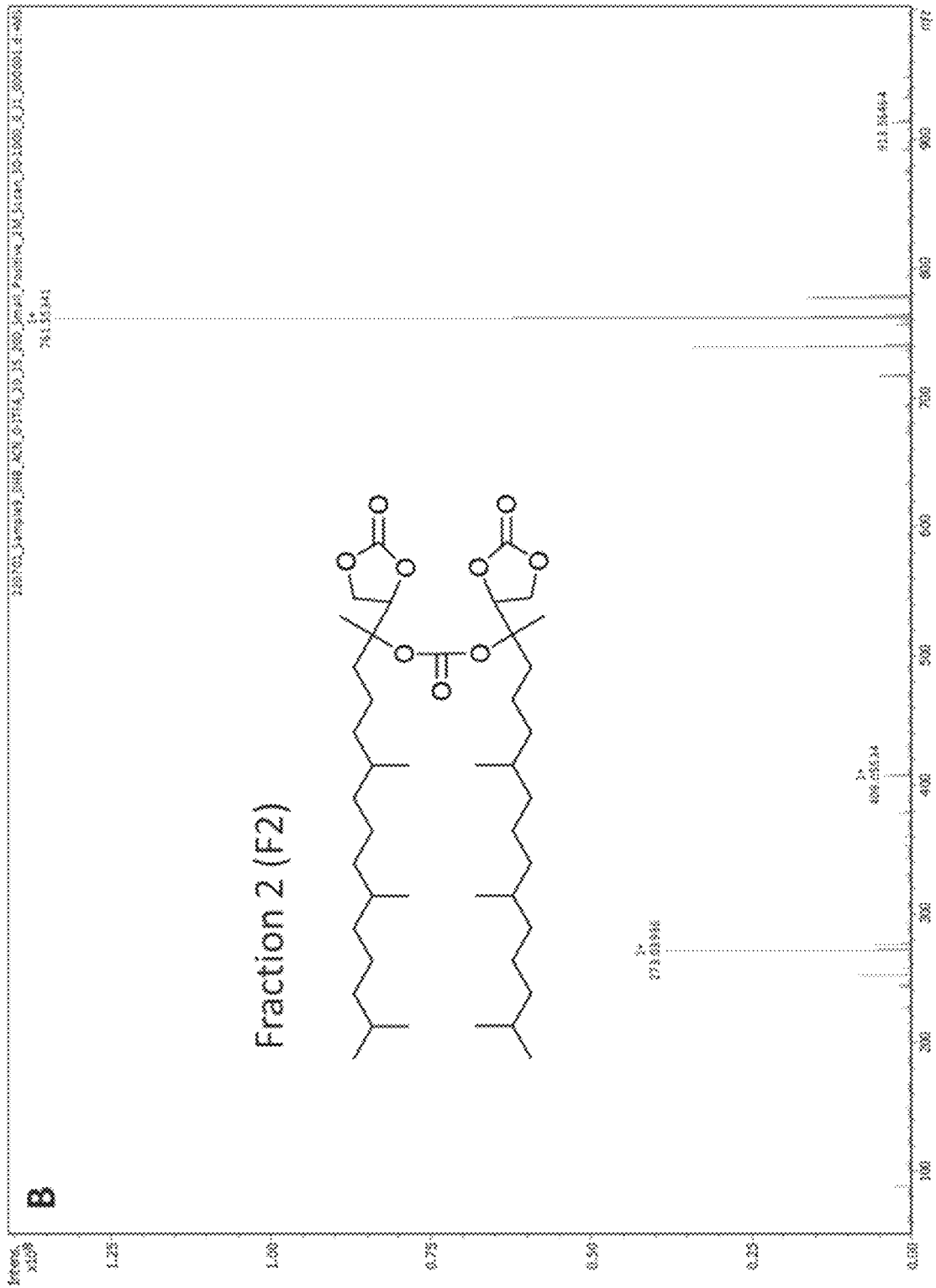
Figure 7C:
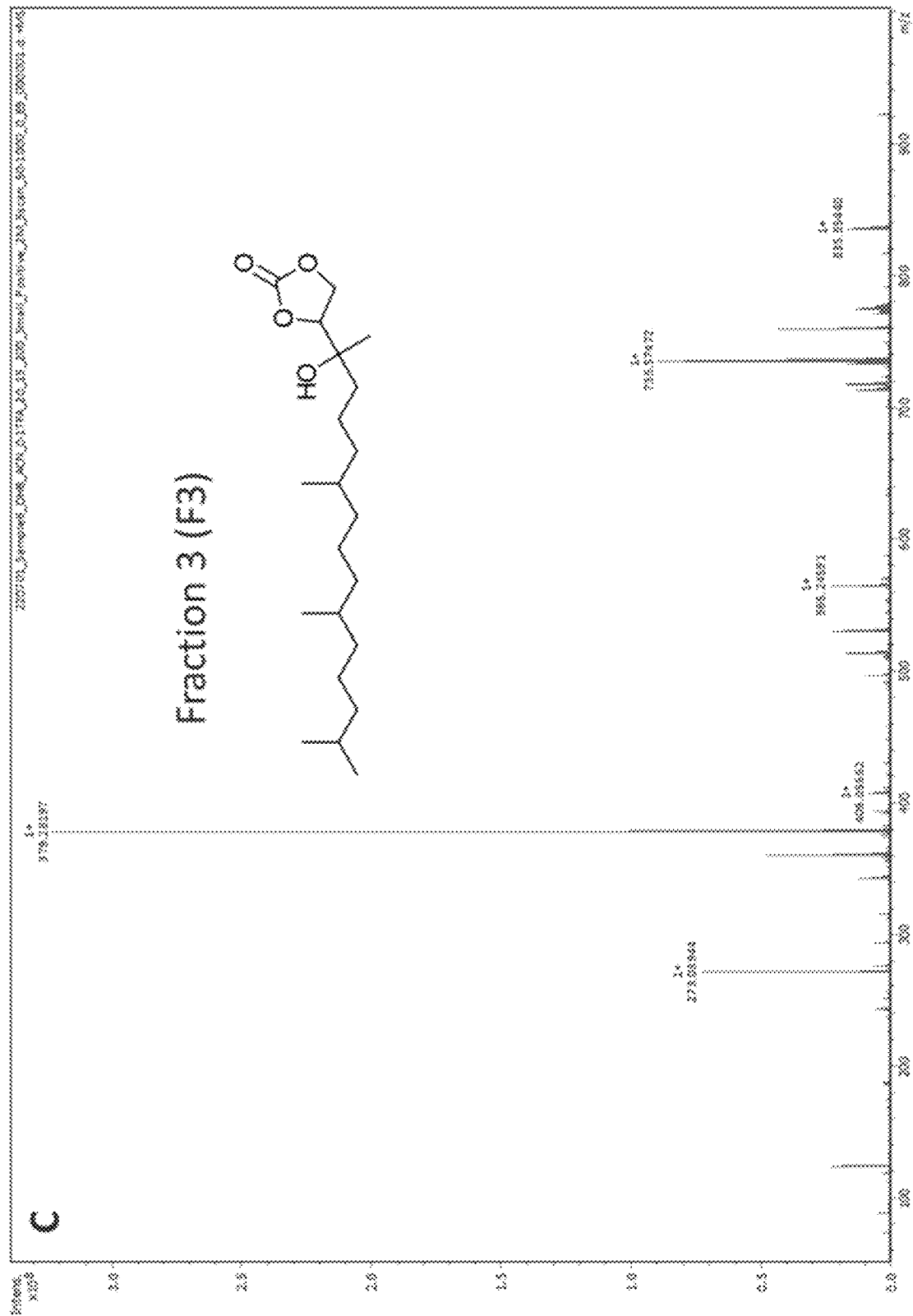

FTICR analysis of purified fractions. Mass spectra was acquired by Fourier transform ion cyclotron resonance mass spectrometry (FT-ICR-MS). FTICR results confirmed the chemical formula of the three fractions (FIGS. 7A-7C).

Figure 8A:
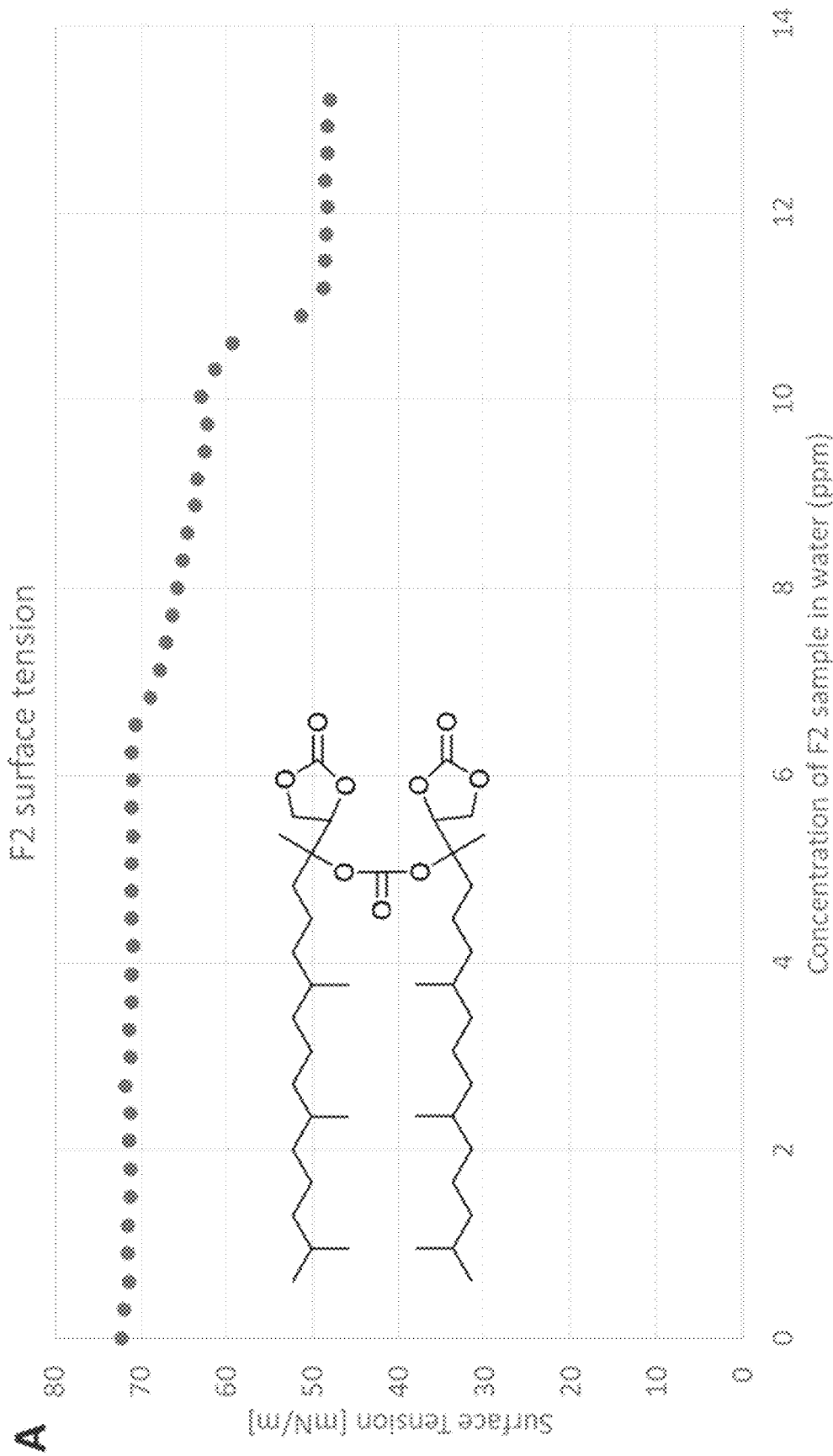
FIGS. 8A-8B illustrate the effect of surfactant concentration on the surface of water using CMC. Fraction F2 is shown in FIG. 7A and Fraction F3 is shown in FIG. 7B.
Figure 8B:
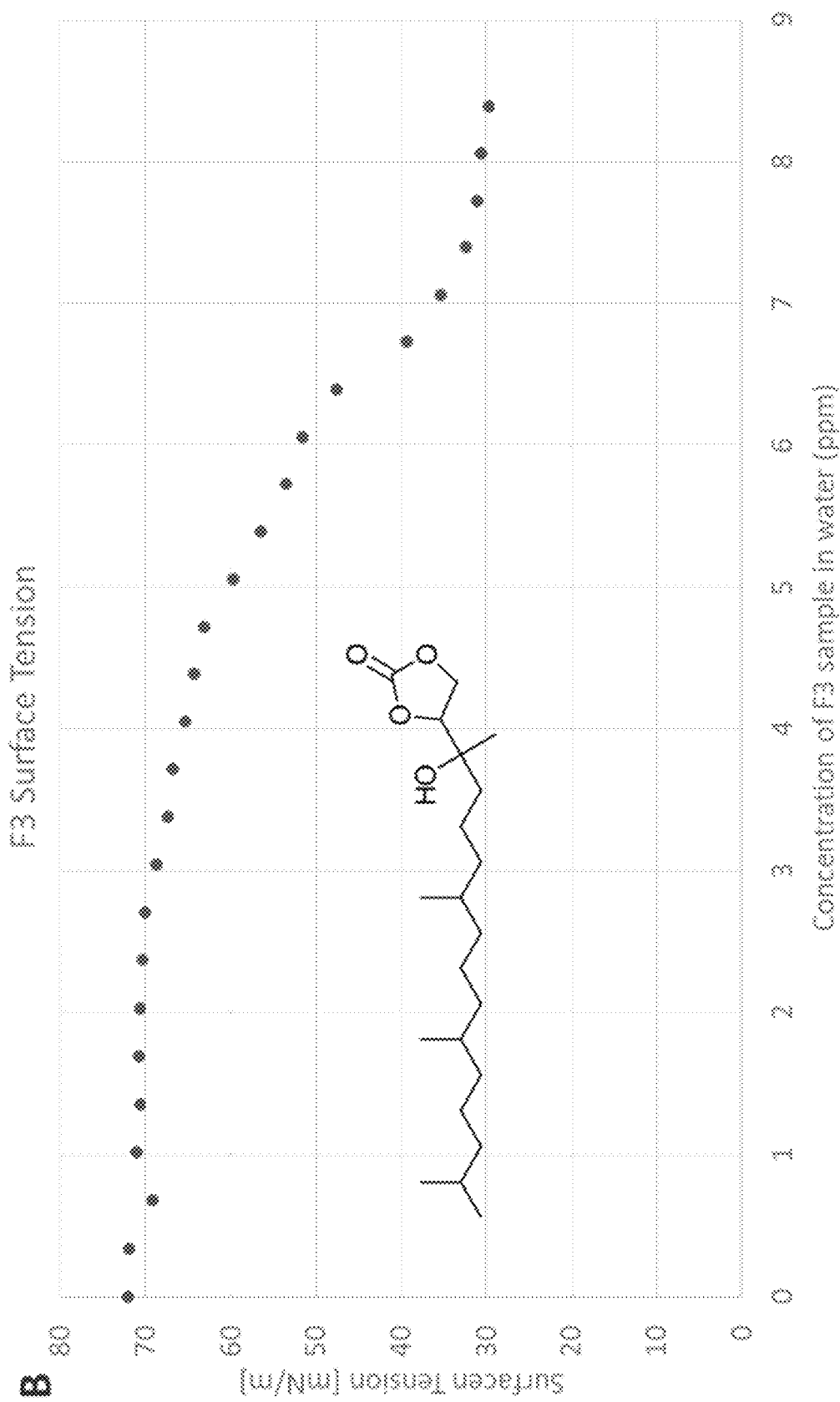

Critical micelle concentration (CMC) test. The three fractions were dissolved in water to make stock solutions for CMC tests. The fraction 1 (F1) could not be dissolved in water to make stock solution, and therefore no CMC was tested for this fraction. F2 and F3 were successfully dissolved in water to make stock solutions for CMC tests. As shown in FIGS. 8A-8B, the CMC for F2 is 11 ppm, and the CMC for F3 is 7 ppm.

The described invention may be further understood by the following non-limiting examples:

Example 1. A surfactant having the formula:

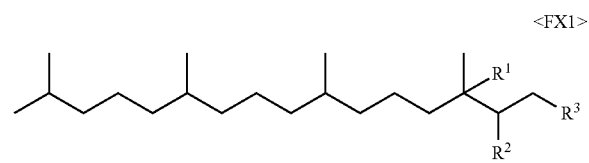

wherein each of $R^1$, $R^2$ and $R^3$ are each independently —OH or an ester having the formula —OOCR$^4$;

wherein $R^4$ is an alkylether selected from the range of $C_1$-$C_{10}$, a hydroxyamine selected from the range of $C_1$-$C_{10}$, a cyanocarboxylic acid selected from the range of $C_1$-$C_{10}$, an arylether or O bonded with $R^1$, $R^2$ or $R^3$ to form an ethylene carbonate group or a dimer; and wherein $R^2$ and $R^3$ are not each —OH.

Example 2. The surfactant of example 1 wherein the surfactant is derived from phytol.

Example 3. The surfactant of example 1 or 2, wherein at least one of $R^1$, $R^2$ or $R^3$ has the formula:

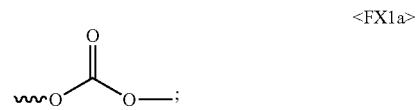

wherein the symbol ∿ is a covalent bond connected at $R^1$, $R^2$ or $R^3$ in formula <FX1>.

Example 4. The surfactant of any of examples 1-3, wherein at least one of $R^1$, $R^2$ or $R^3$ has the formula:

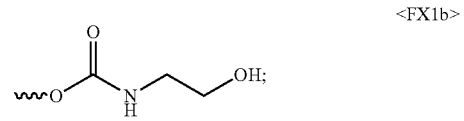

wherein the symbol ∿ is a covalent bond connected at $R^1$, $R^2$ or $R^3$ in formula <FX1>.

Example 5. The surfactant of example 1 or 2 having the formula:

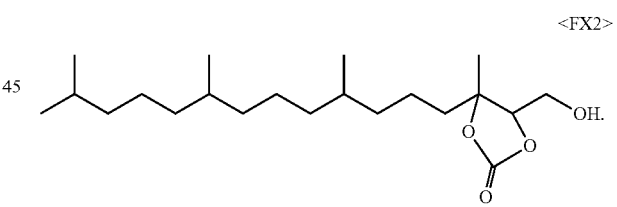

Example 6. The surfactant of example 1 or 2 having the formula:

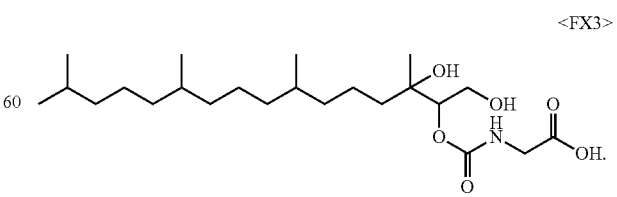

Example 7. The surfactant of example 1 or 2 having the formula:

<FX4>

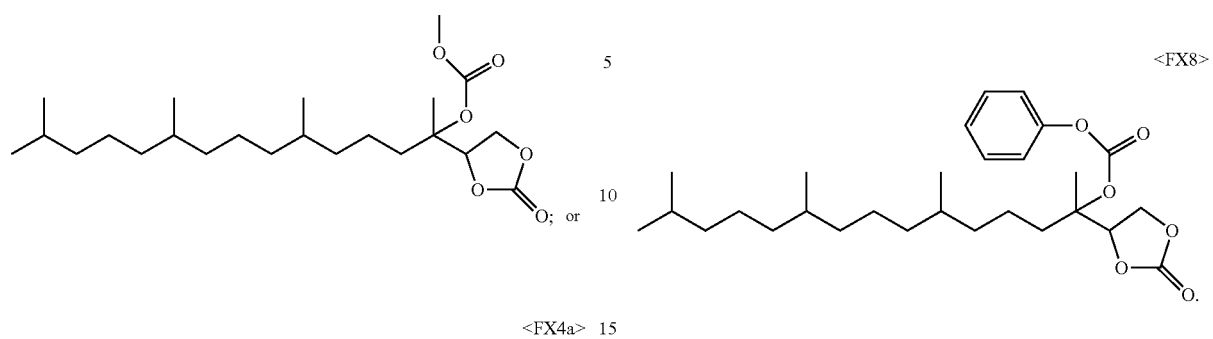

; or

<FX4a>

Example 8. The surfactant of example 1 or 2, wherein the surfactant is a dimer having the formula:

<FX5>

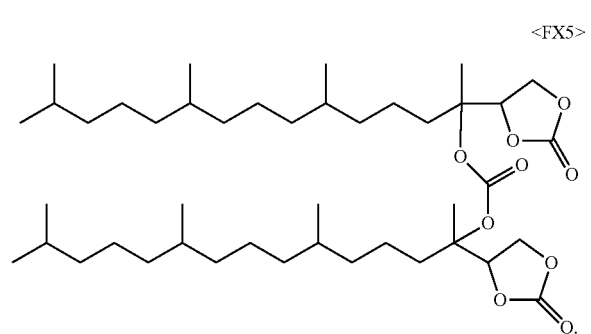 [SMILES: CC(C)CCCC(C)CCCC(C)CCCC(C)(OC(=O)OC(C)(CCCC(C)CCCC(C)CCCC(C)C)C1COC(=O)O1)C1COC(=O)O1]

Example 9. The surfactant of example 1 or 2 having the formula:

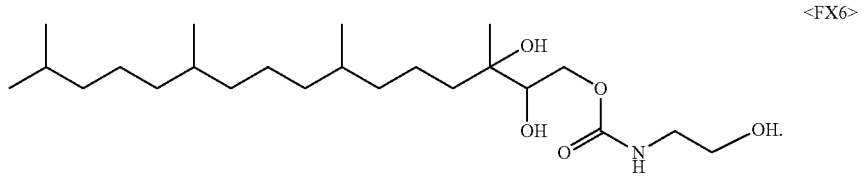 [SMILES: CC(C)CCCC(C)CCCC(C)CCCC(C)(O)C(O)COC(=O)NCCO]

Example 10. The surfactant of example 1 or 2 having the formula:

<FX7>

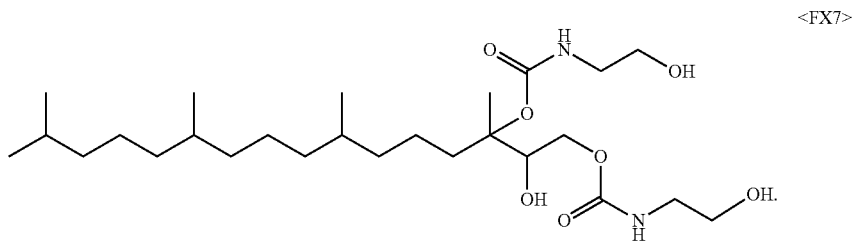 [SMILES: CC(C)CCCC(C)CCCC(C)CCCC(C)(OC(=O)NCCO)C(O)COC(=O)NCCO]

Example 11. The surfactant of example 1 or 2 having the formula:

<FX8>

Example 12. The surfactant of example 9, wherein said surfactant is also a plasticizer.

Example 13. The surfactant of any of examples 1-11, wherein said surfactant reduces the surface tension of water at about 25° C. and about 1 atm to less than 40 mN/m at a weight percentage less than or equal to 0.00015%.

Example 14. A method comprising:
reacting phytantriol with dimethyl carbonate, thereby generating a carbonate surfactant.

Example 15. The method of example 14, wherein said step of reacting phytantriol is catalyzed by triazabicyclodecene.

Example 16. The method of example 14 or 15, wherein said step of reacting phytantriol is performed at a temperature selected from the range of 50° C. to 100° C. and a pressure selected from the range of 0.001 bar to 1.01 bar.

Example 17. The method of any of examples 14-16, wherein said step of reacting phytantriol is performed in a carbonate solvent.

Example 18. The method of example 17, wherein said carbonate solvent can be dimethyl carbonate, diethyl carbonate or diphenyl carbonate.

Example 19. The method of any of examples 14-18 wherein the carbonate surfactant has the formula:

<FX6>

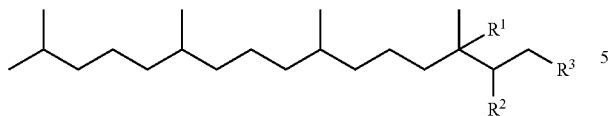

wherein each of $R^1$, $R^2$ and $R^3$ are each independently —OH or an ester having the formula —OOCR$^4$; and wherein the symbol ⌇⌇⌇ is a covalent bond connected at $R^1$, $R^2$ or $R^3$ in formula <FX1>.

Example 20. The method of any of examples 14-19 further comprising:

reacting the carbonate surfactant with an amine, thereby generating an amine surfactant.

Example 21. The method of example 20, wherein said step of reacting the carbonate surfactant is performed at a temperature selected from the range of 50° C. to 100° C.

Example 22. The method of example 20 or 21, wherein the amine surfactant has the formula:

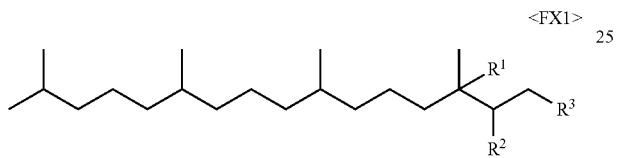

wherein each of $R^1$, $R^2$ and $R^3$ are each independently —OH or an ester having the formula —OOCR$^4$;

wherein $R^4$ is an alkylether selected from the range of $C_1$-$C_{10}$, a hydroxyamine selected from the range of $C_1$-$C_{10}$, a cyanocarboxylic acid selected from the range of $C_1$-$C_{10}$, an arylether or O bonded with $R^1$, $R^2$ or $R^3$ to form an ethylene carbonate group or a dimer; and wherein $R^1$, $R^2$ and $R^3$ are not each —OH.

Example 22. The method of any of examples 14-21 further comprising:

reacting phytantriol, the carbonate surfactant or the amine surfactant with diphenyl carbonate to generate a phenyl surfactant.

Example 23. The method of any of examples 14-22 further comprising epoxidizing phytol, thereby generating phytantriol.

Example 24. A method comprising:

reacting carbonated phytantriol with resorcinol or hydroxyl benzoic acid, thereby generating a plasticizer.

Example 25. The method of example 24, wherein the plasticizer is described by the formula:

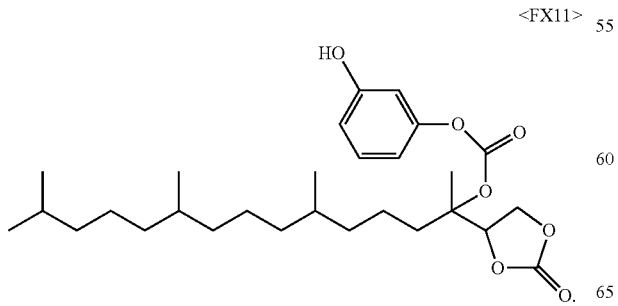

Example 26. The method of example 24, wherein the plasticizer is described by the formula:

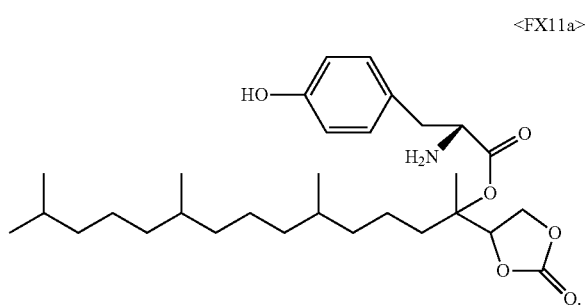 [SMILES: CC(C)CCCC(C)CCCC(C)CCCC(C)(OC(=O)[C@H](N)Cc1ccc(O)cc1)C1COC(=O)O1]

Example 27. The method of any of examples 24-26, wherein said step of reacting phytantriol is catalyzed by triazabicyclodecene.

Example 28. A molecule having the formula:

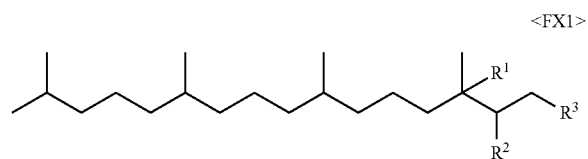

wherein:

$R^1$ comprises at least one of a hydroxyl group, a carbonate group, or a carbamate group, $R^2$ comprises at least one of a hydroxyl group, a carbonate group, or a carbamate group, $R^3$ comprises at least one of a hydroxyl group, a carbonate group, or a carbamate group, and wherein the symbol ⌇⌇⌇ is a covalent bond connected to an unsaturated hydrocarbon chain.

Example 29. The molecule of example 28, wherein:

at least one of $R^2$ or $R^3$ comprises

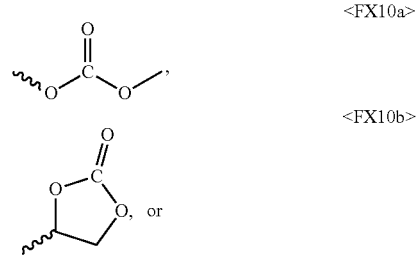

and $R^4$ comprises a hydroxyl group.

Example 30. The molecule of example 28, wherein $R^4$ is

The provided discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX—YY" (wherein XX and YY refer to claim numbers) is intended to provide a multiple dependent claim in the alternative form, and in some embodiments is interchangeable with the expression "as in any one of claims XX—YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. For example, when a device is set forth disclosing a range of materials, device components, and/or device configurations, the description is intended to include specific reference of each combination and/or variation corresponding to the disclosed range.

Every formulation or combination of components described or exemplified herein can be used to practice the invention, unless otherwise stated.

Whenever a range is given in the specification, for example, a density range, a number range, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter is claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A surfactant having the formula:

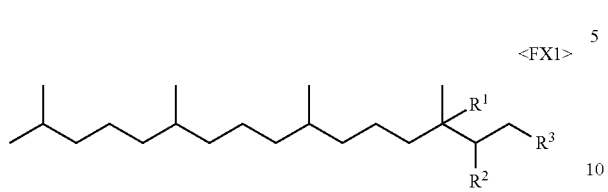
<FX1> wherein each of $R^1$, $R^2$ and $R^3$ are each independently —OH or an ester having the formula —OOCR$^4$;

wherein $R^4$ is an alkylether selected from the range of $C_1$-$C_{10}$, a hydroxyamine selected from the range of $C_1$-$C_{10}$, a cyanocarboxylic acid selected from the range of $C_1$-$C_{10}$, an arylether or O bonded with $R^1$, $R^2$ or $R^3$ to form an ethylene carbonate group or a dimer; and wherein $R^1$, $R^2$ and $R^3$ are not each —OH, and wherein at least one of $R^1$, $R^2$ or $R^3$ has the formula:

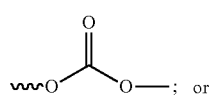
<FX1a> or

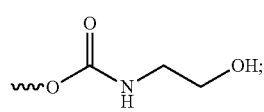
<FX1b> wherein the symbol ∿ is a covalent bond connected at $R^1$, $R^2$ or $R^3$ in formula <FX1>.

2. The surfactant of claim 1 having the formula:

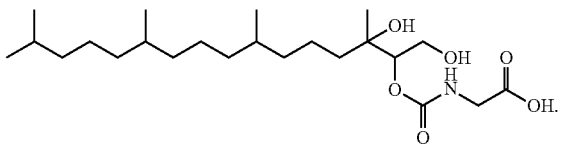
<FX3>

3. The surfactant of claim 1 having the formula:

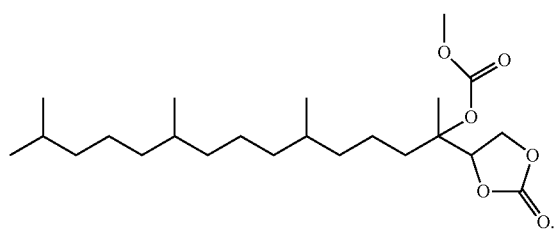
<FX4>

4. The surfactant of claim 1 having the formula:

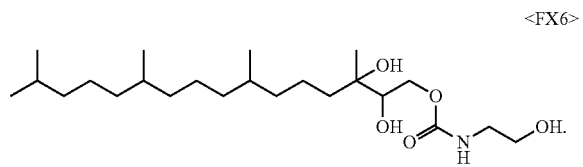
<FX6>

5. The surfactant of claim 1 having the formula:

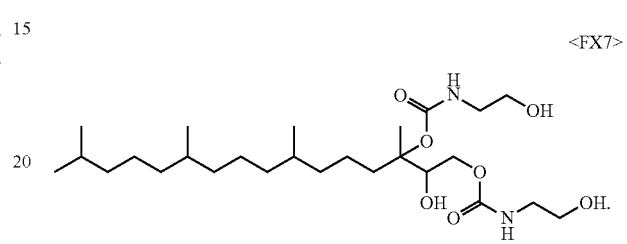
<FX7>

6. A method comprising:

reacting phytantriol with dimethyl carbonate catalyzed by triazabicyclodecene in a carbonate solvent, thereby generating a carbonate surfactant.

7. The method of claim 6 wherein the carbonate surfactant has the formula:

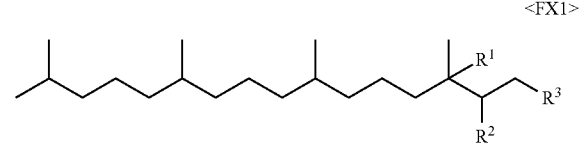
<FX1> wherein each of $R^1$, $R^2$ and $R^3$ are each independently —OH or an ester having the formula —OOCR$^4$; and wherein the symbol ∿ is a covalent bond connected at $R^1$, $R^2$ or $R^3$ in formula <FX1>.

8. The method of claim 6 further comprising:

reacting the carbonate surfactant with an amine, thereby generating an amine surfactant.

9. The method of claim 8, wherein the amine surfactant has the formula:

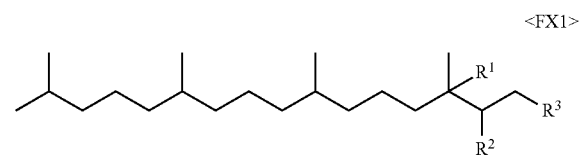
<FX1> wherein each of $R^1$, $R^2$ and $R^3$ are each independently —OH or an ester having the formula —OOCR$^4$;

wherein R⁴ is an alkylether selected from the range of $C_1$-$C_{10}$, a hydroxyamine selected from the range of $C_1$-$C_{10}$, a cyanocarboxylic acid selected from the range of $C_1$-$C_{10}$, an arylether or O bonded with $R^1$, $R^2$ or $R^3$ to form an ethylene carbonate group or a dimer; and wherein $R^1$, $R^2$ and $R^3$ are not each —OH.

10. The method of claim 6 further comprising:

reacting phytantriol, the carbonate surfactant with diphenyl carbonate to generate a phenyl surfactant.

11. The method of claim 6 further comprising:

epoxidizing phytol, thereby generating phytantriol.

12. A surfactant having the formula:

<FX2>

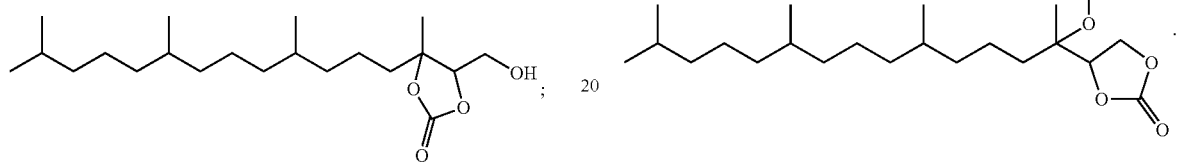

<FX5>

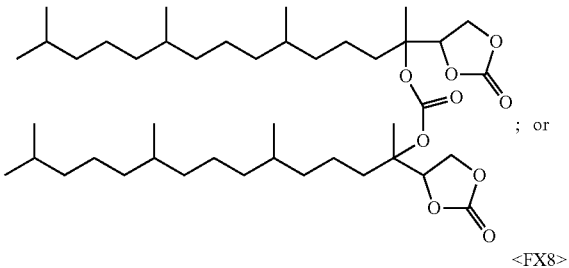

; or

<FX8>

* * * * *